3,378,459
GRAPHITE STRUCTURES IN NUCLEAR REACTORS
Harry Bridge and Brian Thomas Kelly, Culcheth, near Warrington, England, assignors to United Kingdom Atomic Energy Authority, London, England
Continuation of application Ser. No. 250,599, Jan. 10, 1963. This application June 23, 1966, Ser. No. 560,017
Claims priority, application Great Britain, Jan. 12, 1962, 1,212/62; Feb. 7, 1962, 4,806/62
7 Claims. (Cl. 176—84)

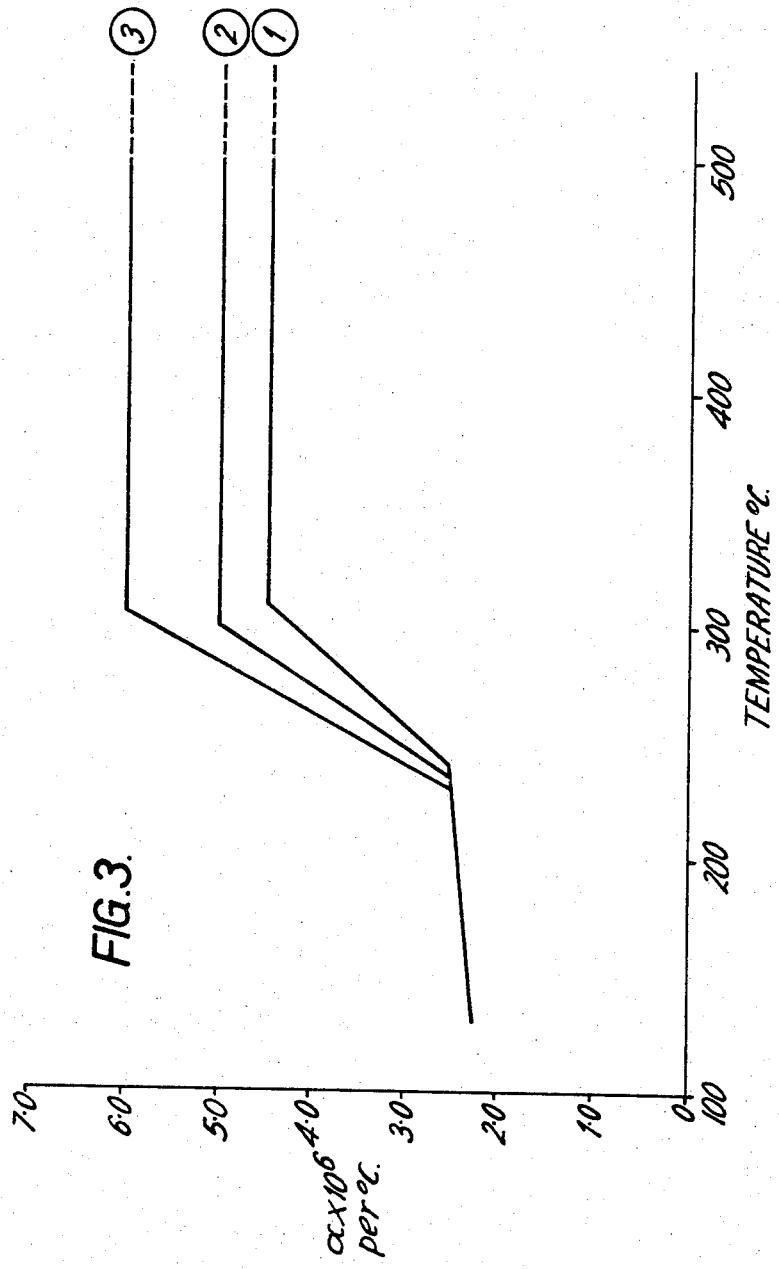

ABSTRACT OF THE DISCLOSURE

In a graphite moderator structure which is to be exposed to irradiation by neutrons in a nuclear reactor during operation and to be subjected to determined temperature distribution during normal operation, there is placed in each region of the structure a graphite whose coefficient of thermal expansion in at least one given direction is selected in accordance with the normal operating temperature in that region to dimensionally stabilize the graphite in such direction under neutron irradiation.

Figure 1:
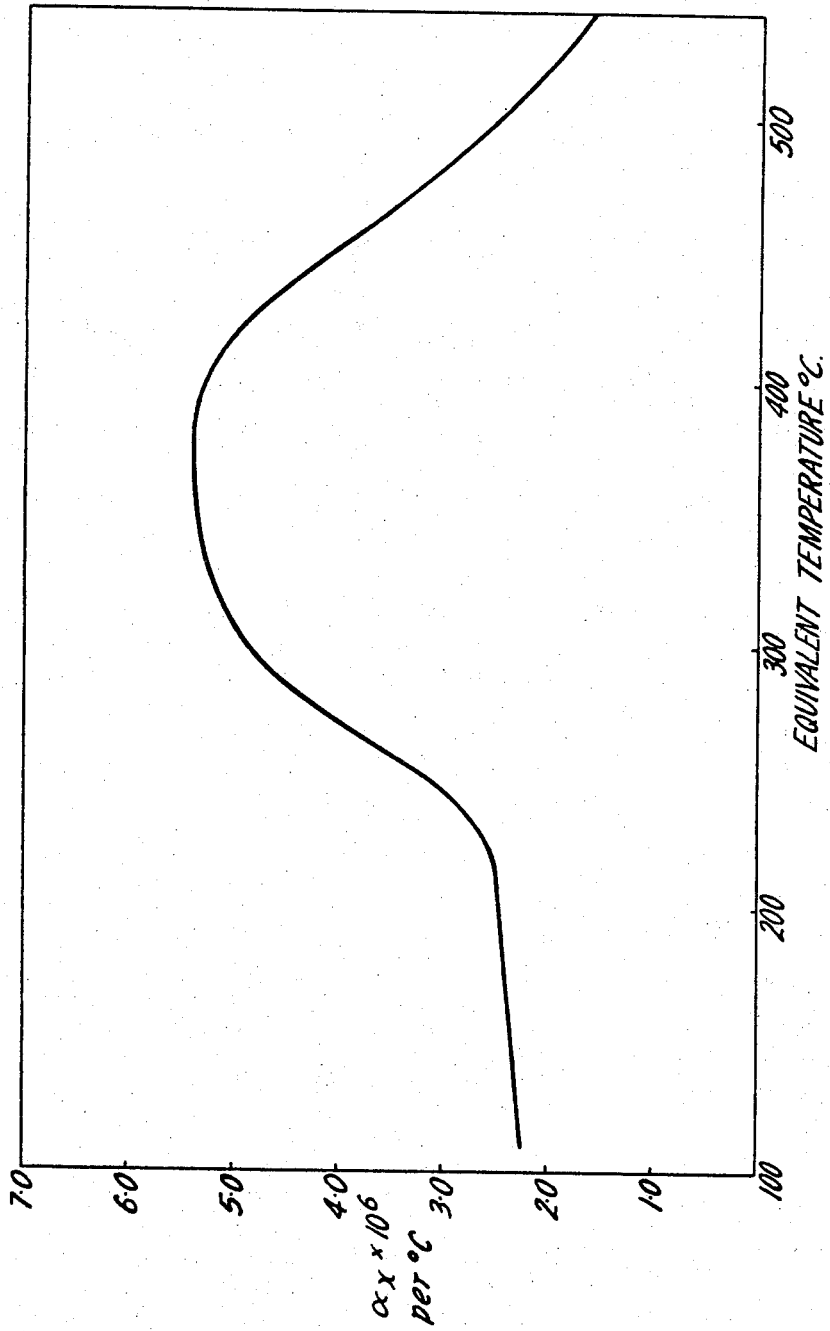

The present application is a continuation of our co-pending application Ser. No. 250,599, filed Jan. 10, 1963, and now abandoned.

---

The present invention relates to graphite structures for nuclear reactors. Such a structure is employed for the moderator in thermal types of nuclear reactor.

When graphite is subject to irradiation by neutrons, the collisions which occur between the neutrons and the carbon nuclei give rise to the displacement of carbon atoms from their lattice positions. Microstructurally, graphite is constituted by parallel planar crystallites and the lattice defects resulting from displacements by neutrons are therefore divisible into interstitial accumulations between the crystalliate planes and vacancies in the planes themselves. The interstitial accumulations promote a tendency to increase the spacing of the planes so that in the direction perpendicular to the planes, known as the $c$ axis direction, a dimensional increase occurs. In the direction of the planes themselves, known as the $a$ axis direction, the vacancies and puckering of the layer planes lead to a dimensional contraction.

The dimensional changes in the microstructure have a similar manifestation macroscopically. In orientated material, layer planes occur in the case of extruded material parallel to the direction of extrusion and in the case of pressed material perpendicular to the direction of pressing. Thus, the bulk dimensional change induced by neutron irradiation in orientated material, often referred to as the Wigner growth, has been generally one of expansion perpendicular to the grain and contraction in the same direction as the grain.

Hitherto, it has been necessary that the graphite which is built up to form a nuclear reactor moderator structure is allowed freedom to expand or contract under irradiation. Elaborate features have had to be evolved in order to accommodate the amounts of irradiation-induced expansion and contraction which will occur over the working life of the reactor. Furthermore, in coherent forms of graphite, different neutron fluxes at different points give rise to unequal rates of dimensional change and hence the possibility of the material becoming deformed and cracked. Great advantages are therefore to be gained if the irradiation-induced dimensional changes of the graphite can be significantly reduced, or better still eliminated entirely.

It has already been recognised that the net effect on graphite of neutron irradiation results from a balance between the rate of production of damage by the neutrons and a concurrently acting process of self-recovery which is due to annealing by thermal activation. For this reason, the irradiation-induced dimensional changes are dependent upon temperature.

According to the present invention, in the building of a graphite structure which is to be exposed to irradiation by neutrons in a nuclear reactor during operation of the latter and to be subject to a predetermined temperature distribution when such operation is normal, there is placed in each region of the structure a graphite whose coefficient of thermal expansion in at least one given direction is selected in accordance with the normal operating temperature in that region with the objective of dimensionally stabilising the graphite in that direction under neutron irradiation.

The invention is based on the finding that an expression relating thermal expansion properties and irradiation-induced dimensional changes is valid if use is made of bulk measurements of the latter as distinct from measurements of the crystal structure for example, by an X-ray diffraction technique. Therefore, it has now become possible, using in this expression direct measurements taken from graphite samples irradiated at constant temperature, to determine a coefficient of thermal expansion which will give a high degree of dimensional stability under irradiation at that temperature.

In all probability there will be differences between the neutron energy spectrum prevailing during the irradiation of the samples and that designed for in the graphite structure in question. Such difference of spectrum in distribution and intensity implies some difference in the rate of production of damage in graphite. An appreciable difference of the respective neutron spectra can therefore preclude direct application of the thermal expansion coefficients for dimensional stability on the basis of true temperatures if the maximum degree of dimensional stability is being sought.

To meet these circumstances, the invention provides that in the building of a graphite structure as previously specified there is placed in each region of the structure a graphite whose coefficient of thermal expansion in at least one given direction is selected for dimensional stability in that direction under the neutron irradiation by (a) correlating the temperature of normal operation of that region with the irradiation temperature required to produce the same net damaging effect on graphite under the irradiation conditions of chosen available graphite irradiation data, (b) estimating for such irradiation temperature the bulk dimensional changes indicated by said data, and (c) using these dimensional changes to determine the requisite coefficient of thermal expansion.

This method presupposes that a temperature correction can be a sufficient compensation for differences of neutron spectrum. As a result of the annealing process mentioned previously, it is deduced subject to certain assumptions that the same net damaging effect is produced in graphite with two different flux spectra if the respective irradiation temperatures are related by an expression derived from annealing kinetics. It is therefore on the basis of such an expression that the temperatures are correlated for the purpose of the method above set forth.

The determination of the requisite coefficient of thermal expansion is made with the following equations by which the macroscopic thermal expansion coefficient $\alpha_x$ in a given direction $x$ is related to the rate of dimensional change $X_x$ in the same direction:

$$\alpha = A_x \alpha_c + (1 - A_x) \alpha_a \quad (1)$$
$$X_x = A_x x_c + (1 - A_x) \alpha_a \quad (2)$$

where $\alpha_c$ is the thermal expansion coefficient of a graphite crystal in the $c$ axis direction,
$\alpha_a$ is the thermal expansion coefficient of a graphite crystal in the $a$ axis direction,
$x_c$ is the rate of dimensional change of a graphite crystal in the $c$ axis direction,
$x_a$ is the rate of dimensional change of a graphite crystal in the $a$ axis direction, and
$A_x$ is a constant in respect of the direction $x$ for a particular quality of polycrystalline graphite.

The condition of $X_x$ being equal to zero determines the value of $A_x$ for stability in terms of $x_c$ and $x_a$. With this value of $A_x$ it is then possible by substitution in Equation 1 to determine the coefficient of thermal expansion, taken over a given temperature range prior to irradiation, which will give dimensional stability, i.e.

$$\alpha_x (\text{for stability}) = \frac{\alpha_c \delta - \alpha_a}{\delta - 1}$$

where $\delta$ is the ratio of $x_a$ to $x_c$, and $\alpha_c$ and $\alpha_a$ are known for the same temperature range. For the range $-196$ to $20°$ C., this equation is reduced to $$\alpha_x (\text{for stability}) = \frac{24\delta + 1.1}{\delta - 1} \times 10^{-6} \text{ per } °C. \quad (3)$$

The values of the ratio $\delta$ to be used in this equation are obtained by calculation from the measurements of bulk dimensional changes and thermal expansion coefficients indicated by the chosen irradiation data, Equations 1 and 2 being used for this purpose. It appears from irradiations to date that the ratio $\delta$ does not change appreciably with irradiation dose and therefore is conveniently regarded as a constant for any particular temperature.

In order that dimensional stability under neutron irradiation may prevail in all directions, it is preferred that the graphite selected for the structure has a random crystal orientation of high crystallographic perfection and is substantially isotropic at least to the extent of the thermal expansion properties. It is therefore a feature of the invention that the structure is built with substantially isotropic graphite, that is to say, graphite with an isotropy ratio in respect of the thermal expansion properties which is less than about 1.3.

So that the application of the invention may be explained in greater detail for one particular example, the relevant graphite irradiation data chosen for this purpose will be set out first of all:

The origin of the chosen data is a series of irradiations at different constant temperatures in a high flux materials testing reactor of the heavy water moderated and cooled type of samples of so-called "grade A" reactor quality graphite. The neutron activation of nickel by the reaction 58Ni (n, p) 58Co provides, in the absence of any well established method of measuring neutron energy spectra, a good monitor for flux in the energy range damaging to graphite and conversion of resulting activity into the "nickel flux" $\phi_{Ni}$ is made using a cross section of 0.107 barn. The high flux irradiations, however, favour the use of the similar reaction 59Co (n, γ) 60Co which is convertible using a cross section of 38.0 barns to $\phi_{Co}$ and then with an experimentally determined factor to the equivalent nickle flux. The following table gives results calculated from the measurements of bulk dimensional changes and thermal expansion coefficients using Equations 1 and 2:

| Temperature, degrees Centigrade: | Calculated percentage rate of change of crystal dimensions per $10^{20}$ nickel flux | | $\delta$ |
|---|---|---|---|
| | $x_c$ | $x_a$ | |
| 200 | 1.65 | −0.27 | −0.15 |
| 225 | 0.84 | −0.13 | −0.16 |
| 250 | 0.59 | −0.10 | −0.17 |
| 350 | 0.19 | −0.08 | −0.31 |
| 450 | 0.13 | −0.04 | −0.35 |
| 650 | 0.17 | −0.02 | −0.12 |

The tabulated values of $\delta$ enable a determination by Equation 3 of the coefficient of thermal expansion required in the graphite for dimensional stability at each temperature in the flux spectrum of the particular testing reactor employed. However, it is preferred for the purposes of the present example that this information is available for the different flux conditions of a graphite moderated reactor since correlation in the designing of a graphite moderator structure is thereby simplified. The information is accordingly related to a standard unit of neutron flux defined by the flux produced at the wall of a fuel element channel in a selected graphite moderated reactor when adjacent fuel of specified form is generating heat at an arbitrarily fixed figure expressed in terms of megawatts per adjacent tonne (mw./Ate.). This standard unit completely defines a rate of irradiation damage for graphite at the channel wall which is taken as the reference point. One then finds the temperature which would have to prevail notionally at this reference point to produce the same net damage effect as has been produced in the testing reactor for equal irradiation doses, this temperature being referred to as the "equivalent temperature."

The previously tabulated testing reactor results have been related on this basis to a reference point in a Calder-Hall reactor at 3.12 mw./Ate. as follows:

| Testing Reactor Temperature, degrees Centigrade | Equivalent Temperature, degrees Centigrade | $\alpha_x \times 10^6/°$ C. for dimensional stability (from eq. (3)) |
|---|---|---|
| 200 | 129 | 2.3 |
| 225 | 173 | 2.4 |
| 250 | 216 | 2.5 |
| 350 | 300 | 4.9 |
| 450 | 378 | 5.4 |
| 650 | 540 | 1.6 |

In the accompanying drawings, FIGURE 1 shows a curve drawn through a plot of $\alpha_x$ against the equivalent temperature.

The particular example now to be considered is a nuclear reactor graphite moderator structure which overall approximates to the shape of an upright right cylinder and is penetrated from top to bottom by circular constant-section channels arranged vertically in parallel relationship on a square pitch. For present purposes, it is assumed that nuclear fuel disposed centrally in the channels extends continuously without variation of cross section from top to bottom of the moderator structure. Through the annular space between the fuel and the channel walls of the flow of a gaseous coolant, taken in the present example to be carbon dioxide, is in the upward direction. Consequently there is a vertical temperature gradient increasing with height; it is the variation of temperature due to this gradient of which account is taken in the present example.

A temperature distribution for normal operation based on 300° C. at the mid-horizontal plane is shown in the following table for eleven equispaced levels unmbered −5 to 5 and two intermediate levels −4.5 and 4.5 midway between the −4 and −5 levels and the 4 and 5 levels respectively.

| Moderator level: | Channel wall temperature, °C. |
|---|---|
| 5 | 400 |
| 4.5 | 399 |
| 4 | 395 |
| 3 | 381 |
| 2 | 356 |
| 1 | 331 |
| 0 | 300 |
| −1 | 269 |
| −2 | 244 |
| −3 | 219 |
| −4 | 205 |
| −4.5 | 201 |
| −5 | 200 |

The above tabulated temperatures are corrected to equivalent temperatures by means of the following equation derived from annealing kinetics:

$$\left(\frac{1}{T_e} - \frac{1}{T}\right) = \frac{K}{E} \log_e \left(\frac{P_e}{3.12}\right) \quad (4)$$

where

T is the true absolute temperature
$T_e$ is the equivalent absolute temperature,
K is Boltzmann's constant ($8.61 \times 10^{-5}$ en./° K.),
E is the activation energy for annealing, and
$P_e$ is the equivalent power rating.

The activation energy is assumed for present purposes to have a single value on the basis that annealing takes place in a sequence of processes controlled by initial behaviour. The value adopted is therefore applicable to the initial stages of annealing and is determined by experiment. Experimental results have varied, but the variation is within limits consistent with the degree of accuracy to be expected of this procedure of moderator construction. The value used in the present example is 1.2 ev.

It will be noted that Equation 4 calls for the power rating in the moderator structure under consideration to be expressed in terms of an equivalent rating; since reactor geometries and fuels vary, the power rating in one reactor will not necessarily be in the same proportion to the graphite damage rate as in another reactor. The conversion to equivalent rating serves to put the rating of the one reactor in the same proportion to damage rate as in the other or reference reactor. Use is made of a relationship whereby the damage rate in an infinite graphite mass at a distance r from a uniform infinite line source of fission neutrons is proportional to the function $$\frac{1}{r}\phi(r)$$

Account is taken of the effect of voids in the graphite structure by rewriting this function as $$\frac{1}{r}\phi(r_g)$$

where $r_g$ is the distance through graphite. The rate of damage to the graphite in the moderator can be obtained by summing the damage due to each fuel channel, each such channel being regarded as an infinite line source of fission neutrons. Thus, the damage rate at a point O is $$\phi_d = cW \sum_i \frac{1}{r_i} \phi(r_{ig}) \quad (5)$$

where $r_i$ is the distance from O of the $i^{th}$ fuel channel $r_{ig}$ is the distance from the fuel channel to O through graphite and W is the power rating per unit length of fuel.

Now, the power rating per unit length of fuel may be considered proportional to $AP\rho_u$ where A is the cross-sectional area of the fuel, P the power rating in mw./Ate. of uranium, and $\rho_u$ the density of uranium in the fuel in gms./c.c. Thus, for comparing two reactors, denoted by the suffixes 1 and 2, $$\frac{\phi_{d_1}}{\phi_{d_1}} \frac{P_1}{P_2} = \frac{A_2}{A_1} \frac{\sigma_{u_2}}{\sigma_{u_1}} \left\{ \frac{\left[\sum_i \frac{1}{r_i} \phi(r_{ig})\right]_2}{\left[\sum_i \frac{1}{r_i} \phi(r_{ig})\right]_1} \right\} = y \text{ (say)}$$

Therefore, for finding the equivalent power rating $P_e$ with respect to the reference point in the Calder-Hall reactor, $$\frac{P_e}{3.12} = \frac{yP_o}{3.12}$$

where $P_e$ is the local power rating of the moderator structure under consideration.

The effect of different graphis densities may be allowed for by replacing $\phi(r_{ig})$ by $\phi(r_i'_g)$ where $r_i'_g = (\rho_0)r_{ig}$, $\rho$ being the actual density of the graphite and $\rho_0$ a standard density. The function $\phi(r_g)$ has been found experimentally for a standard density of 1.6 gms./cc. and is shown in the accompanying FIG. 2. For the reference point in the Calder-Hall reactor, the fuel cross sectional area is 6.66 sq. cm. and the summation is found to be 1.32 for a graphite density of 1.75 gms./cc. Consequently, if A, the cross sectional area of the fuel to be used in the moderator structure, is expressed in sq. cm., the complete expression for this structure is:

$$P_e = \frac{P_oA}{8.79} \frac{\rho_u}{18.7} \sum_i \frac{1}{r_i} \phi(r_{ig}) \quad (6)$$

the figure of 18.7 being the uranium density applicable to the reference point.

Figure 2:
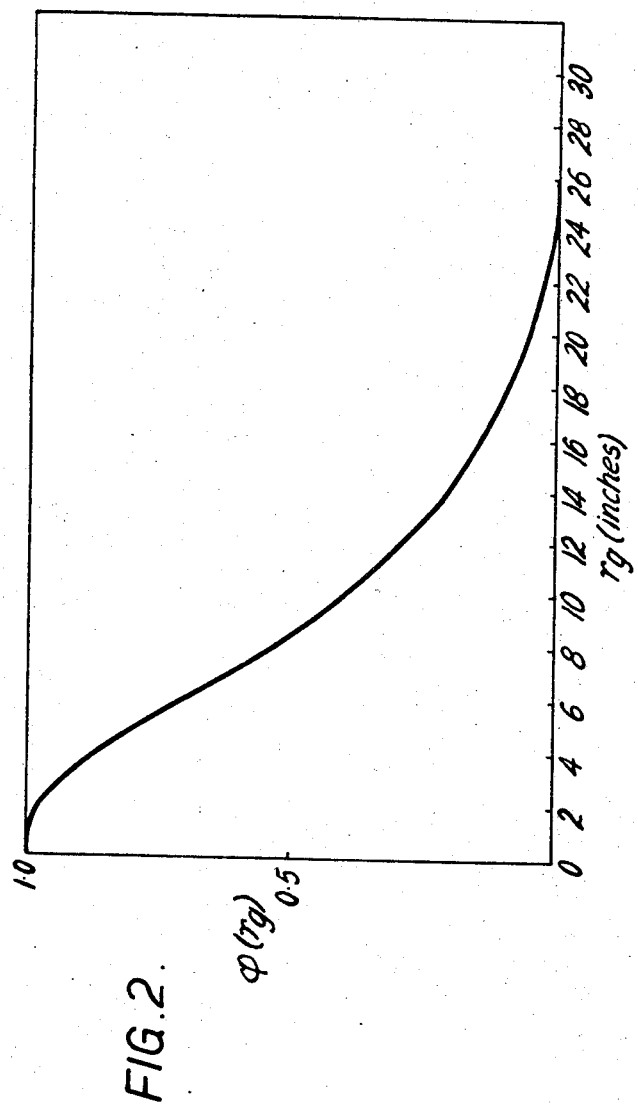

The local power rating for normal operation is found at each level of the moderator structure under consideration and is converted to the equivalent rating using Equation 6 and the function of FIG 2. With the equivalent rating figures, the equivalent temperatures are found by means of Equation 4 and the coefficients of thermal expansion for dimensional stability read off the curve of FIG. 1. The following table gives the results for the moderator structure under consideration on the assumption that in this case Equation 6 reduces to $P_e = 0.954P_o$.

| Moderator Level | Local Power Rating | Equivalent Power Rating mw./Ate. | Equivalent Temp., degrees Centigrade | $\alpha \times 10^6/°$ C. for stability |
|---|---|---|---|---|
| 5 | 0 | 0 | ∞ | |
| 4.5 | 0.97 | 0.93 | 442 | 4.35 |
| 4 | 1.98 | 1.86 | 414 | 4.90 |
| 3 | 3.68 | 3.52 | 378 | 5.45 |
| 2 | 5.19 | 4.96 | 343 | 5.40 |
| 1 | 5.88 | 5.60 | 316 | 5.15 |
| 0 | 6.30 | 6.0 | 285 | 4.50 |
| −1 | 5.88 | 5.60 | 257 | 3.60 |
| −2 | 5.19 | 4.96 | 236 | 2.90 |
| −3 | 3.68 | 3.52 | 217 | 2.50 |
| −4 | 1.98 | 1.86 | 213 | 2.50 |
| −4.5 | 0.97 | 0.93 | 221 | 2.60 |
| −5 | 0 | 0 | ∞ | |

Following the above tabulated results in the building of the moderator structure, from the bottom to a height between the intermediate level −4.5 and the level −4 the graphite blocks have a thermal expansion coefficient of $2.60 \times 10^{-6}/°$ C., in the next layers up to between the levels −3 and −2 the blocks have a thermal expansion coefficient of $2.50 \times 10^{-6}/°$ C., and so on. The quality of the graphite employed is to be polycrystalline of high crystallographic perfection and substantially isotropic, the specified thermal expansion coefficient being the average over the temperature range −196° C. to 20° C. in this case.

As an alternative to the treatment in layers of uniform thickness, the layers may have varying thickness, especially to meet the case where there is considerable variation of the equivalent temperature gradient and graphites are available with a wide variety of thermal expansion coefficients covering the required range in small steps. In general, the moderator structure is divided into regions each defined by isotherms corresponding to the limits of preselected temperature ranges covering the full compass of the temperature distribution, and a particular thermal expansion coefficient to minimise irradiation-induced dimensional change is specified for isotropic graphite to be placed in each region; at low temperatures, a low expansion coefficient is required and at higher temperatures (up to a certain limit) higher expansion coefficients are required. Thus, the thermal expansion coefficients in the various regions increase in ascending order of the temperature ranges.

It is to be anticipated that in a graphite moderator structure constructed in this way any change of dimensions induced by irradiation will be so small over the working life of the reactor that the graphite blocks can be arranged to be contiguous over all surfaces at the temperature of normal operation and that such contiguity will persist during operation. There is consequently the advantage over previous arrangements employing contiguity on the basis of the temperature being sufficiently high for the dimensional change to be solely one of contraction that play does not develop between the blocks; loss of rigidity in the structure and inter-channel leakage are therefore avoided.

Further significant advantages stem from the differences of the neutron flux at various points in a graphite block during reactor operation. Usually there is some increase in the intensity of the flux towards the centre of a reactor and therefore in some, at least, of the blocks there will be a flux gradient increasing from the outwardly directed face towards the inwardly directed face. A non-stable graphite will be subject due to this flux variation to a differential dimensional change which tends to cause bowing of the block. Another sort of flux variation occurring in the graphite is the progressive softening of the neutron spectrum with increasing distance from a fuel channel through the block. The differential dimensional change which occurs in non-stable graphite in this case tends to cause cracking of the graphite. The dimensional stability obtainable by the present invention eliminates these bowing and cracking tendencies.

It will of course be realised that the specification of different thermal expansion coefficients in different regions demands a construction in the form of building units, such as the blocks already quoted. Since it cannot be expected that the shaping of such units to the contours of the isotherms defining the regions will be convenient, the coefficient to be employed for any particular unit should be judged by the region in which most of the unit lies.

Although the foregoing aims at exact determinations for stability, there are several factors making it difficult to obtain in practice. In addition to the fact apparent from the preceding paragraph that stepless variation of the coefficient cannot be provided, there is likely to be uncertainty in predicting for new graphites that stability will still prevail when the dose is approaching such a high figure as, say, 100,000 mwd./Ate. U (megawatt days per adjacent tonne of uranium) which is believed to be feasible for the graphite moderator of thermal nuclear reactors. In particular there is the possibility that the ratio $\delta$ may be a function of dose at high dose figures. There is also the possibility that large $c$ axis expansions of the graphite crystals at high irradiation doses may close the porosity normally responsible for reducing the volume thermal expansion coefficient of the bulk material to below that of a single crystal; this effect may have the consequence of varying the constant A. However, methods have been devised to enable testing for A variation without neutron irradiation so that the suitability of new graphites in this respect can be easily ascertained.

Having regard to these parctical limitations, it can suffice that approximations to the plot in FIG. 1 are applied directly to the moderator graphite of gas-cooled graphite-moderated reactors of the kind in which rod-like fuel elements are disposed in parallel channels penetrating the moderator. Therefore, as an aid to the dimensional stabilisation of this graphite, such parts as are subject during normal operation to a temperature above 325° C. should have a coefficient of thermal expansion in at least one given direction which is greater than $4.5 \times 10^{-6}/°$ C. measured over the range $-196$ to $+20°$ C. The nature of this approximation tends in the direction to offset possible departures from dimensional stability at high irradiation doses. A practical limitation is, of course, imposed on the extent to which the quoted figure can be exceeded by the condition that the coefficient cannot be greater than one third of the thermal expansion coefficient of the crystal in the $c$ axis direction. This isotropy limitation is about $7.3 \times 10^{-6}/°$ C. in the previously mentioned temperature range. Thus, a coefficient significantly above the quoted figure may, for a given temperature of normal operation, especially one little above 325° C., lead during the early stages of the graphite life to expansion under irradiation, this effect being preferable to the alternative that with initial stability there comes later a change in behavior whereby contraction occurs. Contraction is apt to create tensile forces to which the graphite is weakly resistant so that cracking can occur.

The possibility of contraction is avoided with greater certainty if, as is preferred, such graphite as is subject during normal operation to a temperature above 300° C. has a coefficient of thermal expansion in at least one given direction which is greater than $5.0 \times 10^{-6}/°$ C. in the previously mentioned temperature range.

For any graphite in the reactor which has a normal operating temperature of less than 325° C. the invention further provides on the grounds of dimensional stability that it has a thermal expansion coefficient which for temperatures of normal operation between 130° C. and 240° C. is equal to or greater than $$\left(\frac{T}{400}+1.95\right) \times 10^{-6}/°C.$$

and for temperatures of normal operation between 240 and 325° C. is equal to or greater than $$\left(\frac{T}{35}-4.30\right) \times 10^{-6}/°C.$$

where T is the temperature in degrees centigrade, the coefficients being measured in the range $-196$ to $+20°$ C. The preferred rule is that between 130° and 230° C. the thermal expansion coefficient is as previously stated, namely equal to or greater than $$\left(\frac{T}{400}+1.95\right) \times 10^{-6}/°C.$$

but that between 230 and 300° C. this coefficient is equal to or greater than $$\left(\frac{T}{27}-6.10\right)-10^{-6}/°C.$$

As before, the graphite preferably has a random crystal orientation so as to be isotropic to a high degree, at least to the extent of the thermal expansion properties. The graphite should also be well-graphitized to a high standard of crystallographic perfection.

The lower limits of thermal expansion coefficient quoted above (including those said to be preferred) for the various ranges of operating temperatures are derived from FIG. 1, and in the accompanying drawing marked FIG. 3 is shown a plot of these lower limits against temperature. The line indicated 1 represents the minimum for present purposes, the line indicated 2 represents the preferred lower limit and the line indicated 3 represents a practical upper limit, this last-mentioned line being defined by $[T/400+1.95] \times 10^{-6}/°$ C. between 130 and 230° C. $[T/22-7.85] \times 10^{-6}/°$ C. between 230° C and about 300° C., the coefficient being, as previously, in respect of the range $-196$ to $+20°$ C.

It is to be noted that FIG. 3 omits the tailing-off at high temperatures to be sen in FIG. 1. There is irradiation data available to support this omission and on this basis the coefficients should be kept uniformly high for all temperatures above, say, 350° C.

FIGURE 3 has application to other kinds of reactor subject to a temperature correction to account for difference of damage flux. One method of deducing this correction is based on a comparison of effective atomic displacement rates. For a predetermined complete flux spectrum in respect of given energy intervals denoted $\phi(E_n)$, the atomic displacement rate $I_d$ is given by the equation:

$$I_d = \int_0^\infty \phi(E_n) \cdot \sigma(E_n) N_d(E_n) \cdot dE_n$$

where $E_n$ is the neutron energy,
$(E_n)$ is the elastic scattering cross section of carbon, and
$N_d(E_n)$ is the number of displacements produced on average for each neutron collision, this number being given by $$N_d(E_n) = \frac{\alpha E_n}{E_d} \text{ for } E_n < \frac{L_c}{\alpha}$$

and $$N_d(E_n) = \frac{L_c}{4E_d}\left[2 - \frac{L_c}{\alpha E_n}\right] \text{ for } E_n > \frac{L_c}{\alpha}$$

The values of the parameters for present purposes are:

$\alpha = 0.284$
$E_d = 25$ ev.
$L_c = 25 \times 10^3$ ev.

If the atomic displacement rate for the standard unit upon which FIG. 3 is based is denoted $I_d'$, then the corrected temperature $T_c$ (absolute) can be deduced from:

$$\left(\frac{1}{T_c} - \frac{1}{T}\right) = \frac{K}{E} \log_e \left(\frac{I_d}{I_d'}\right)$$

where T, K and E have the same connotation as for Equation 4. Previously it has been pointed that the standard unit adopted herein is represented by a Calder-Hall reactor at 3.12 mw./Ate, which corresponds to an atomic displacement rate of $8.42 \times 10^{-9}$ atoms per atom per second.

Although the foregoing description has specified thermal expansion coefficients for the range −196 to +20° C., these coefficients can be converted as required to the equivalents for other temperature ranges. Equation 1 is used for this conversion and the expression thus derived for the coefficient $\alpha_t$ in respect of the other range is:

$$\alpha_t = \left(\frac{\alpha_x - \alpha_a}{\alpha_c - \alpha_a}\right)(\alpha_c' - \alpha_a') + \alpha_a'$$

where $\alpha_x$ is the specified coefficient, $\alpha_c$ and $\alpha_a$ are the crystal coefficients respectively in the c and a axis directions for the same range as the specified coefficient, and $\alpha_c'$ and $\alpha_a'$ are again the crystal coefficients but for the other range.

The following table gives certain conversion by way of illustration:

−196 to +20° C., per °C.:   +100 to +700° C., per °C.:
    5.0×10⁻⁶                    6.7×10⁻⁶
    2.0×10⁻⁶                    3.3×10⁻⁶
+20 to +120° C., per °C.:
    5.3×10⁻⁶
    2.0×10⁻⁶

We claim:
1. In the building of a graphite moderator structure which is exposed to irradiation by neutrons in a nuclear reactor during operation of the reactor, a method of ensuring a high degree of dimensional stability in the graphite in a given direction comprising the steps of:
 (a) determining the temperature distribution throughout the graphite moderator structure for normal operation of the reactor;
 (b) delimiting at least one region of the structure wherein obtains a selected range of normal temperature during normal operation of the reactor;
 (c) determining a bulk thermal expansion coefficient for ensuring a high degree of dimensional stability in a given direction for graphite to be utilized in said delimited region of the structure according to the relationship:

$$\alpha_x \text{ (for stability)} = \frac{\alpha_c \delta - \alpha_a}{\delta - 1}$$

wherein:
$\alpha_x$ (for stability) = the thermal expansion coefficient of the graphite in a direction x for stability,
$\alpha_c$ = the thermal expansion coefficient of a graphite crystal in the c axis direction,
$\alpha_a$ = the thermal expansion coefficient of a graphite crystal in the a axis direction, and
$\delta$ = the ratio of the rate of irradiation-induced dimensional change $x_a$ of a graphite crystal in the a axis direction to the rate of irradiation-induced dimensional change $x_c$ in the c axis direction, the values of $x_a$ and $x_c$ being determined by Equations 1 and 2 of the specification from experimental measurements of bulk dimensional changes and thermal expansion coefficients under experimental irradiation at a temperature representative of said normal temperature range;
 (d) fabricating the moderator structure of the reactor by locating, in said region, graphite having a bulk thermal expansion coefficient calculated by step (c) to give a high degree of dimensional stability in said given direction under neutron irradiation at the temperature obtaining in said region during normal operation of the reactor.

2. A method according to claim 1 wherein the graphite is substantially isotropic.

3. A method according to claim 1 wherein the irradiation flux spectrum of said experimental irradiation is different from that of said nuclear reactor and wherein the representative temperature of said region is an equivalent temperature related to an average temperature of said region prevailing during normal operation of the reactor, the equivalent tempeature being that which, in the neutron flux spectrum of the experimental irradiations, would produce substantially the same net neutron damage rate in said given direction as will be produced in the neutron flux spectrum of the neuclear reactor in the moderator structure wherein said average temperature prevails.

4. In a nuclear reactor, a graphite moderator structure subject to a predeterminable temperature distribution during normal operation of the reactor and comprising assempled graphite units, said moderator structure being delimited into a plurality of regions wherein obtains a selected range of temperature during normal operation of the reactor, and wherein each unit located at least primarily in a given region has a bulk thermal expansion coefficient selected to ensure a high degree of dimensional stability in a given direction for said graphite in that delimited region, said bulk thermal expansion coefficient being selected according to the following relationship:

$$\alpha_x \text{ (for stability)} = \frac{\alpha_c \delta - \alpha_a}{\delta 1}$$

wherein
$\alpha_x$ (for stability) = the thermal expansion coefficient of the graphite in a direction x for stability,
$\alpha_c$ = the thermal expansion coefficient of a graphite crystal in the c axis direction,
$\alpha_a$ = the thermal expansion coefficient of a graphite crystal in the a axis direction,
$\delta$ = the ratio of the rate of irradiation-induced dimensional change $x_a$ of a graphite crystal in the a axis direction to the rate of irradiation-induced dimensional change $x_c$ of a graphite crystal in the c axis direction, the values of $x_a$ and $x_c$ being determined by Equations 1 and 2 of the specification from experimental measurements of bulk dimensional changes and thermal expansion coefficients under experimental irradiation at a temperature representative of the normal range of said given region.

5. In a nuclear reactor, a moderator structure according to claim 4 wherein the graphite is at least substantially isotropic.

6. In a nuclear reactor, a moderator structure according to claim 4 wherein each graphite unit lying at least primarily in a given region having a normal operating temperature of at least 325° C. has a bulk thermal expansion coefficient selected to ensure a high degree of dimensional stability in a given direction for said graphite in that delimited region, said bulk thermal expansion coefficient being selected from within the range defined by curves 1 and 3 of FIGURE 3.

7. In a nuclear reactor, a moderator structure according to claim 6 wherein the graphite is at least substantially isotropic.

No references cited.

REUBEN EPSTEIN, *Primary Examiner.*